Dec. 27, 1966 R. BIZE 3,295,041
ELECTRIC VOLTAGE GENERATOR WITH STABILIZING
AND REGULATING SYSTEM
Filed Sept. 4, 1963
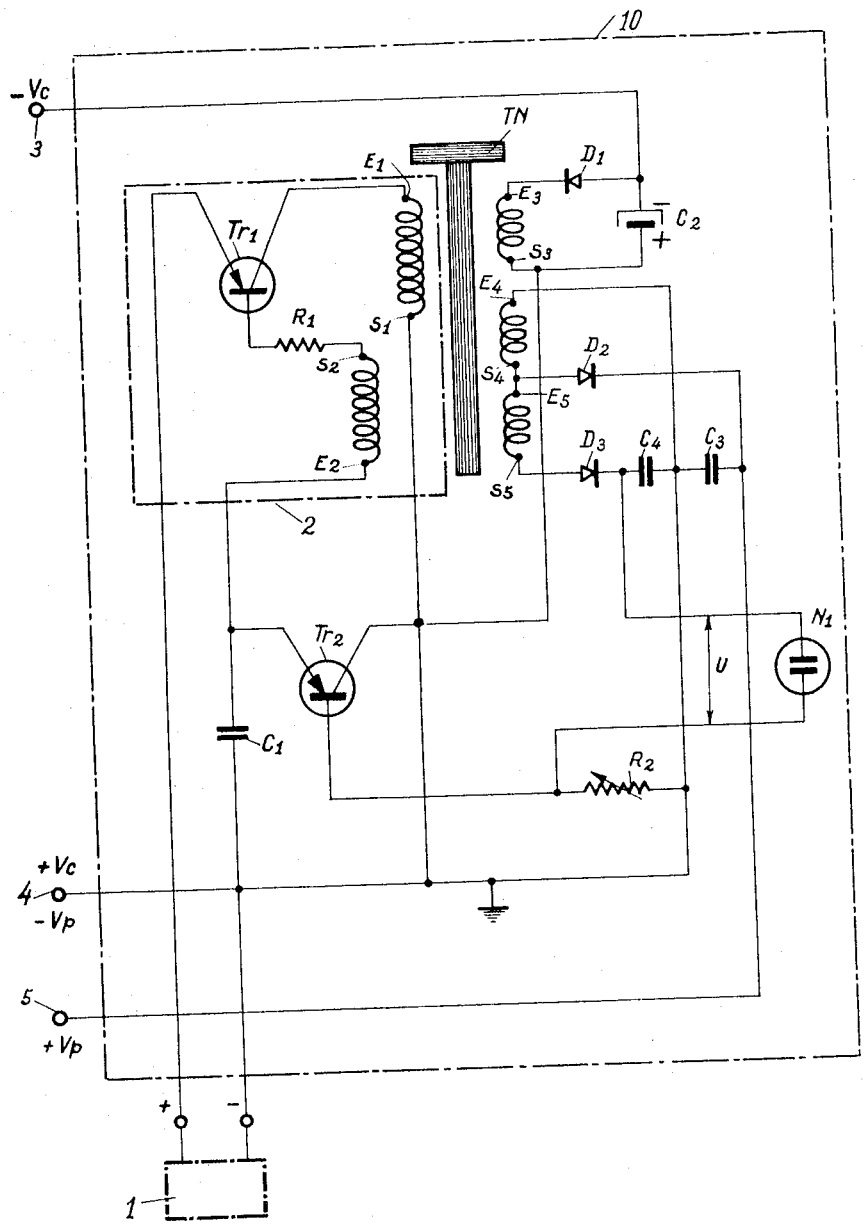
René Bize
by: Edwin E. Greigg
Attorney

United States Patent Office 3,295,041
Patented Dec. 27, 1966

3,295,041
ELECTRIC VOLTAGE GENERATOR WITH STABILIZING AND REGULATING SYSTEM
René Bize, Paris, France, assignor to Société Chauvin Arnoux, Paris, France, a company
Filed Sept. 4, 1963, Ser. No. 306,500
Claims priority, application France, Sept. 12, 1962, 909,205, Patent 1,333,450
2 Claims. (Cl. 321—2)

The present invention relates to an electric voltage generator which is provided with a stabilizing and regulating system, said generator being designed to supply a receiver with current under constant voltage.

It is known that one of the main disadvantages of portable electric devices of the battery-fed type and particularly those which are fitted with tubes requiring filament heating and a plate potential is the need to make provision for a number of feed batteries having different voltages and outputs.

The generator in accordance with the present invention is especially intended to overcome the disadvantages referred-to above.

The function of said generator, starting from a single electric cell (or like means) which serves as a power source (having a direct-current voltage which usually ranges from 1.5 v. to 5 v.), is in fact to obtain one or a number of voltages which are stabilized (namely which are constant under no load) and which are also regulated (thus remaining constant if a current is delivered). These voltages are usually higher (for example: 500, 1,000 or 5,000 volts) than that of the power source but can also be of the same order of magnitude or even of lower value if so desired.

When comprising a number of voltages, the generator supplies the different voltages, outputs or bias voltages which are necessary for the operation of a device such as an electronic tube amplifier starting from a single cell which is chosen as a function of its characteristic properties, availability, price, overall size or any other factor.

The incorporated regulating device also makes it possible to space apart or even to eliminate the adjustments which result from variations in current supply sources.

Further objects of the invention will additionally be brought out by the following description.

In accordance with the present invention, the generator which is capable of supplying at least one stabilized electric voltage comprises in combination a power source having a direct-current voltage, a transistorized blocking oscillator working at high frequency and connected to said source, a low-frequency transformer fed from said source, said transformer comprising a primary winding connected to said source and triggered by the transistor of said oscillator, a sustaining coil for said oscillator, said coil being coupled to the primary winding referred-to above, and a secondary circuit comprising at least one secondary winding, said transformer being designed to pass low-frequency current impulses, means on said transformer for causing the oscillator to oscillate at high frequency, said means consisting in that the primary winding and sustaining coil provide relatively to the secondary winding substantial leakage flux and low stray capacitance both direct and indirect, said generator further comprising a regulating circuit with resistance and capacitance so as to determine the low frequency of recurrence of blocking of the oscillator, said resistance being variable and constituted by a transistor which is connected to the sustaining coil of said oscillator, means for rectifying the voltage delivered by said secondary winding, a reference element generating a stabilized voltage having a value which is adapted to the voltage desired, and means for transmitting the difference between the voltage of the secondary circuit and that of the reference element to the transistor of the oscillator regulating circuit.

The figure of the accompanying drawing is a simplified diagram of a generator in accordance with the invention as given by way of example without implied limitation.

In the example considered, the generator 10 (as shown in the figure) provides across its terminals 3, 4, 5 the two voltages (heating $V_c$ and high-tension $V_p$) which are necessary for the operation of a vacuum tube amplifier (not shown). Said generator also delivers a third voltage U which serves to feed a built-in luminous signal lamp constituted by a neon tube $N_1$. As will be explained below, the tube $N_1$ further constitutes a voltage reference element employed for the regulation. However, for this latter purpose, the use of a neon tube is not essential. It would also be possible to employ, for example, a Zener diode.

By way of example, it is possible to have with the above notations:

$V_c$=1.25 volt (100 ma.)
$V_p$=30 volts (5 ma.)
$U$=70 volts (0.5 ma.)

The device which is designated by the reference 10 essentially comprises a power source having direct-current voltage such as a dry cell or accumulator 1 which feeds an oscillator 2 comprising a transistor $Tr_1$, the collector of which is connected to a primary winding $E_1S_1$ of a transformer TN and the base of which is controlled by a sustaining coil $E_2S_2$ through a limiting resistance $R_1$. As will be seen below, the transformer TN comprises as many secondary windings for increasing voltage (but which could also reduce voltage) as there are output voltages to be obtained.

The oscillator 2 is a high-frequency oscillator (for example 150 to 200 kilocycles), the high-frequency oscillation of which is of the blocking type (blocking oscillator) and is periodically blocked at a recurrence frequency which depends on the difference between the output voltage and the reference voltage U. The recurrence frequency is chosen very low relatively to the high frequency of the oscillator (for example, the recurrence frequency varies between 5 and 10 kilocycles).

In order to ensure this condition, the primary winding $E_1S_1$ forms part of a specially designed low-frequency transformer TN.

The transformer TN chosen is of the low-frequency type in order to permit of good performance in the transfer of power to the secondary and the use thereof at the recurrence frequency, but a particular feature of this transformer is a design which provides for substantial leakage flux and stray capacitance of low value (direct or reflected) between the primary winding, sustaining coil and secondary winding in such manner as to permit of high frequency operation of the oscillator.

This condition is satisfied by making provision for a substantial insulation between the winding layers and, for example, by adopting honeycomb windings for the secondaries.

In the design which corresponds to multiple secondary windings, while these latter are intended to provide a certain leakage flux relatively to the primary winding and sustaining coil, said multiple secondary windings must, on the other hand, be coupled close together in order to permit of good regulation while at the same time respecting the condition which requires a low stray capacitance (which condition is best satisfied by means of a winding with a number of tappings when the operating voltages can have common poles).

This arrangement of the transformer is provided in order to permit of oscillation of the transistor $Tr_1$ at high frequency (150 to 200 kilocycles) without making use of additional windings, the transistor $Tr_1$ being designed to oscillate at the frequency which is given by the leakage inductance and stray capacitance.

The recurrence frequency of the oscillator 2 (blocking frequency) is predetermined by the time constant which is represented by the constant of a resistive-capacitive circuit (RC) comprising a capacitance $C_1$ which is connected between the source 1 and the sustaining coil $E_2S_2$, and a variable resistance constituted by the emitter-collector space of a regulating transistor $Tr_2$, the base of which is connected on the one hand to a grounded adjustable resistance $R_2$ and on the other hand to the tube $N_1$.

The base of the transistor $Tr_2$ is fed through $R_2$ and polarized by means of the reference neon tube $N_1$.

The secondary circuit of the transformer TN is provided in the example described with three windings: the first winding $E_3S_3$ corresponds to the voltage $V_c$, the second winding $E_4S_4$ corresponds to the voltage $V_p$. The third winding $E_5S_5$ has a point $S_4$ which is common with the second winding. The voltage which is developed across the terminals $E_4S_5$ is applied to one of the terminals of the tube $N_1$ after rectification by the diode $D_3$ and filtering by the capacitor $C_4$.

The circuit further comprises rectification diodes $D_1D_2$ as well as associated equalizing capacitors $C_2$, $C_3$ for the operating voltages within the scope of the example chosen in which said voltages $V_c$, $V_p$ are direct-current voltages.

The operation is as follows:

The transistor $Tr_1$ oscillates at an H.F. frequency which is determined by the leakage inductance and stray capacitance of the transformer TN.

As each high-frequency oscillation takes place, the capacitance loading of $C_1$ through its associated resistance as determined by $Tr_2$ increases by a value which is a function of the voltage depending on the apparent impedance of the windings $E_1S_1$ and $E_2S_2$ in respect of the high frequency considered.

The capacitor $C_1$ is therefore charged progressively up to the moment when the positive potential which is thus developed across the terminals of $C_1$ has become sufficient to block the oscillation of the oscillator 2. This time interval is a function of the value of the resistance possessed by $Tr_2$. In point of fact, the resistance of $Tr_2$ is a function of its bias and of its base current, said base current being in turn a function of the difference between the terminal voltage of $E_4S_5$ and of the voltage U of the tube $N_1$ taken as a reference. It will thus be understood that the regulating group which is made up of the transistor $Tr_2$ and the capacitance $C_1$ modifies the blocking value of the oscillator and accordingly maintains the output voltage at the value which is chosen.

In order to determine the value of the capacitance $C_1$, the value of the resistance as represented by the regulating transistor $Tr_2$ should preferably be chosen so as to correspond to the maximum gain or sensitivity of the transistor employed. The value of $C_1$ is then determined as a function of the mean recurrence frequency which is adopted. One thus has the benefit of the maximum gain of the transistor, which correspondingly reduces the power drawn from the secondary which is necessary for the regulation.

By way of numerical example, using the values referred-to above in respect of the voltages $V_c$, $V_p$ and U and a voltage of 4.5 v. in the case of cell 1, it is possible to choose the following values for the main elements of the circuit:

Transformer TN:
    Winding $E_1S_1$=45 turns of 50/100 mm.
    Winding $E_2S_2$=35 turns of 18/100 mm.
    Winding $E_3S_3$=41 turns of 40/100 mm.
    Winding $E_4S_4$=500 turns of 10/100 mm.
    Winding $E_5S_5$=1,000 turns of 5/100 mm.
    $R_1$=100 ohms.
    $R_2$=10,000 ohms.

Transformer TN—Continued
    $C_1$=80 nanofarads.
    $C_2$=50 microfarads.
    $C_3$=10 nanofarads.
    $C_4$=10 nanofarads.

The transistors $Tr_1$, $Tr_2$ can be constituted by tubes of the type 2N525.

Experience has shown that, under these conditions, it is possible to obtain a duty factor of 3 in the case of the power source 1 relatively to the regulated systems at present employed, while the precision of stabilization can reach 1%, which is remarkable when taking into account the simplicity of the regulating means employed. It will also be noted that the generator in accordance with the invention lends itself to miniaturization.

The generator in accordance with the invention further has the following advantages:

(a) A very good efficiency which results:

On the one hand from the high-frequency operation of the transistor $Tr_1$ which permits a very short cut-off time, On the other hand from the fact that the follow-up system consumes only a small amount of power for the regulation;

(b) Negligible consumption on no load, which results from the two features referred-to above. During operation, the primary consumption is practically proportional to the load;

(c) A very good stabilization and very good regulation by reason of the use of a high frequency for the operation of the oscillator 2, thereby permitting of blocking at a precise time—the transistor having in addition a rapid variation of gain with the frequency;

(d) One additional regulation effect can be employed for the purpose of improving the stabilization ranges which have already been obtained automatically by means of the circuit of the figure, as a result of the frequency shift produced by the load on the elements of the recurrence oscillator 2.

It is in fact possible to ensure by design that the maximum efficiency of the transformer TN in low frequency corresponds to the highest recurrence frequency (for example 10 kilocycles) which is given by the maximum load;

(e) The possibility of obtaining very high voltages by means of secondary windings which have a small number of turns (and consequently which can readily be insulated and which are of small bulk). In fact, the voltage at the secondary is given by the high cut-off speed which is made possible by the high-frequency operation of $Tr_2$ and is limited only by the stray capacitance of the secondary.

The example of embodiment which is given in FIG. 1 comprises a neon tube $N_1$ as voltage reference. It will be wholly apparent that it is possible to make use of a Zener diode or any other reference device without thereby departing from the scope of the invention.

What I claim is:

1. In a generator capable of supplying at least one stabilized electric voltage, the combination comprising: a power source having direct current voltage, a transistorized blocking oscillator working at high frequency and connected to said source, a low frequency transformer fed from said source, said transformer comprising a primary winding connected to said source and triggered by the transistor of said oscillator, a sustaining coil for said oscillator, said coil being coupled to said primary winding, a secondary circuit comprising at least one secondary winding of the honeycomb type, said transformer being designed to pass low frequency current impulses, means on said transformer for causing the oscillator to oscillate at high frequency, said primary winding and said sustaining coil providing relatively to the secondary winding substantial leakage flux and low stray capacitance both direct and indirect, a regulating circuit with resistance and capacitance for determining the low frequency of recurrence of blocking of the oscillator, said resistance being variable and comprising a transistor connected to said sustaining coil of said oscillator, means for rectifying the voltage delivered by said secondary winding, a reference element generating a stabilized voltage having a value which is adapted to the voltage desired, and means for transmitting the difference between the voltage of the secondary circuit and that of the reference element to the transistor of the oscillator regulating circuit.

2. In the device according to claim 1, wherein the value chosen for the resistance represented by the regulating transistor corresponds to the maximum gain, a capacitance which is associated with said transistor being determined as a function of the main recurrence frequency which has been established.

References Cited by the Examiner
UNITED STATES PATENTS 2,983,878  5/1961  Priebe _____ 331—106

FOREIGN PATENTS 1,301,262  7/1962  France.

JOHN F. COUCH, *Primary Examiner.*

W. H. BEHA, *Assistant Examiner.*